United States Patent [19]
Loew et al.

[11] Patent Number: 5,139,186
[45] Date of Patent: Aug. 18, 1992

[54] ADJUSTABLE AMMO BOX RETAINER

[76] Inventors: Al E. Loew, 12800 W. 9 Mile, Oak Park, Mich. 48237; Donald E. Henning, 5238 Bud La., New Haven, Mich. 48048

[21] Appl. No.: 831,489

[22] Filed: Feb. 5, 1992

Related U.S. Application Data

[62] Division of Ser. No. 689,394, Apr. 22, 1991.

[51] Int. Cl.⁵ .............................................. B60R 11/00
[52] U.S. Cl. .................................. 224/42.39; 206/3; 220/8; 220/529; 224/42.33
[58] Field of Search .............. 224/42.42, 42.33, 42.38, 224/42.39, 42.4; 206/3, 591, 597; 220/8, 545, 542, 529, 534

[56] References Cited

U.S. PATENT DOCUMENTS

| | | | |
|---|---|---|---|
| 1,568,014 | 12/1925 | Watson | 224/42.38 |
| 1,919,568 | 7/1933 | McCosh | 220/529 |
| 2,223,074 | 11/1940 | Martin | 220/8 |
| 3,459,327 | 8/1969 | Harris | 206/3 |
| 3,572,536 | 3/1971 | Wehner | 220/8 |
| 4,367,572 | 1/1983 | Zielenski | 224/42.39 |
| 4,728,017 | 3/1988 | Mullican | 224/42.42 |

Primary Examiner—Linda J. Sholl

[57] ABSTRACT

The invention is an adjustable, open-box style tray assembly to hold ammunition boxes of varying sizes while providing easy access to the boxes. The assembly has a bulkhead therein which can be fastened at various positions so as to adapt the assembly to different box sizes. The variable length and position of a strap attached to the assembly further accommodate differences in box sizes. A modification of the invention is a tray assembly having one tray half slidably in another tray half so that the assembly's length can be changed. A telescoping bulkhead attaches to the tray halves and is repositionable transversely to the slide direction of the tray halves, thereby accommodating boxes of various widths. Also, hooks on the retaining strap for the box engage the tray halves to prevent the relative movement of the tray halves.

8 Claims, 3 Drawing Sheets

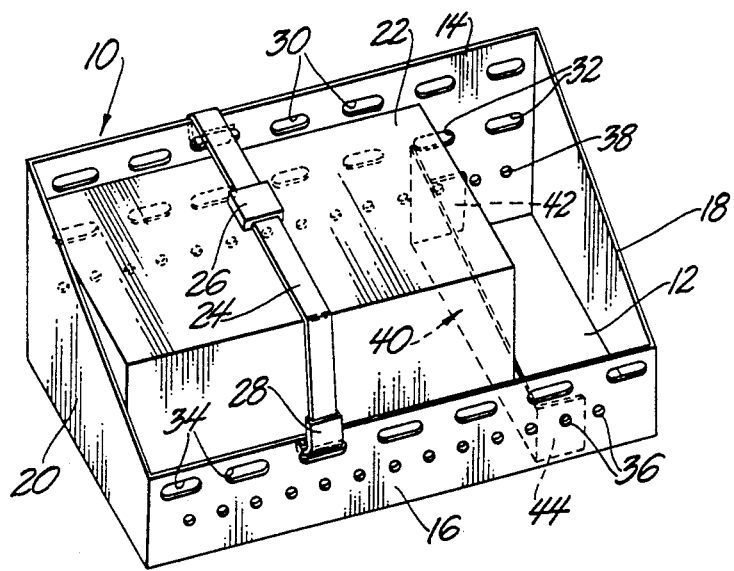
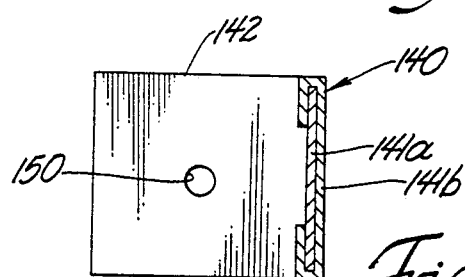
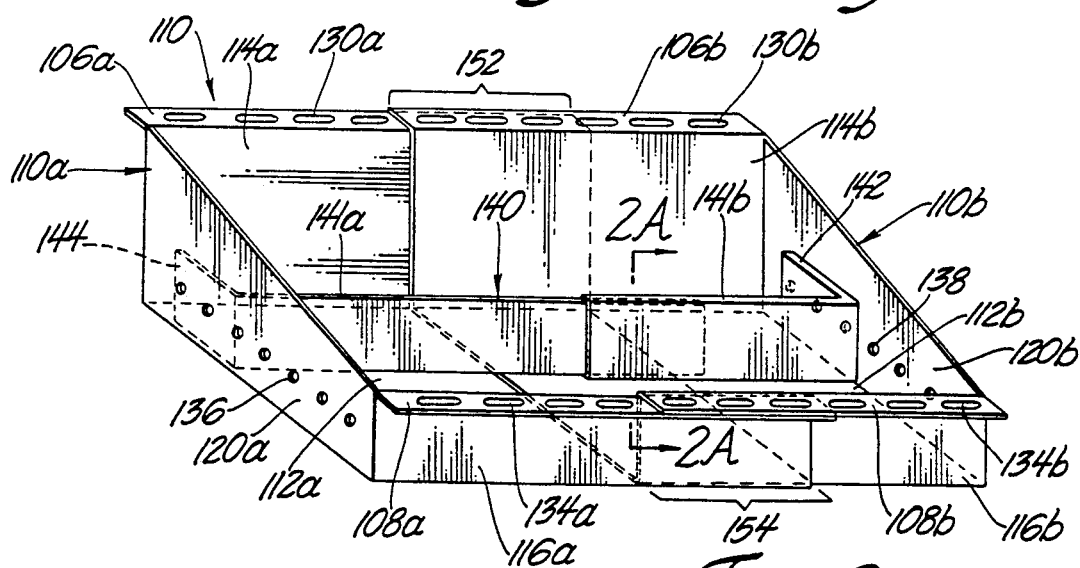
Fig. 1
Fig. 2A  Fig. 1A
Fig. 2

ADJUSTABLE AMMO BOX RETAINER

GOVERNMENT USE

The invention described herein may be manufactured, used and licensed by or for the U.S. Government for governmental purposes without payment to us of any royalty thereon.

This is a division of application Ser. No. 07/689,394 filed Apr. 22, 1991.

BACKGROUND

Military vehicles typically have guns mounted at various points on the exterior of the vehicle and typically have ammunition boxes in open, box-like containers mounted at or near the guns. These containers must allow quick access to the ammunition while securely holding the ammunition when the vehicle takes shocks during off road travel. One problem with such containers is the limited range of ammunition box sizes which they can accommodate.

SUMMARY

The invention is a container that securely holds ammunition boxes, provides easy access to the boxes and accommodates a wide range of box sizes. The invention has a tray assembly in the known open box configuration with trapezoidal sides. The tray assembly has a positionable bulkhead which can be fastened at various locations within the assembly so that the assembly closely receives ammunition boxes having wide variation in size. The tray assembly includes a strap whose position and length can be adjusted to further accommodate different box sizes.

One version of the invention is a tray assembly comprised of one tray half slidably received in another tray half so that the assembly's length can be changed. A telescoping bulkhead is attached to the tray halves and can be moved transversely to the direction in which the tray halves slide. Additionally, hooks on a box retaining strap engage holes in the tray halves to prevent their movement relative to one another.

BRIEF DESCRIPTION OF THE DRAWINGS

FIG. 1 is a perspective view of the first embodiment of the invention.

FIG. 1A is an isolated view of the bulkhead shown in FIG. 1.

FIG. 2 shows a second embodiment of the invention.

FIG. 2A is a sectional view of the bulkhead along line 2A—2A in FIG. 2.

DETAILED DESCRIPTION

Figure 3:
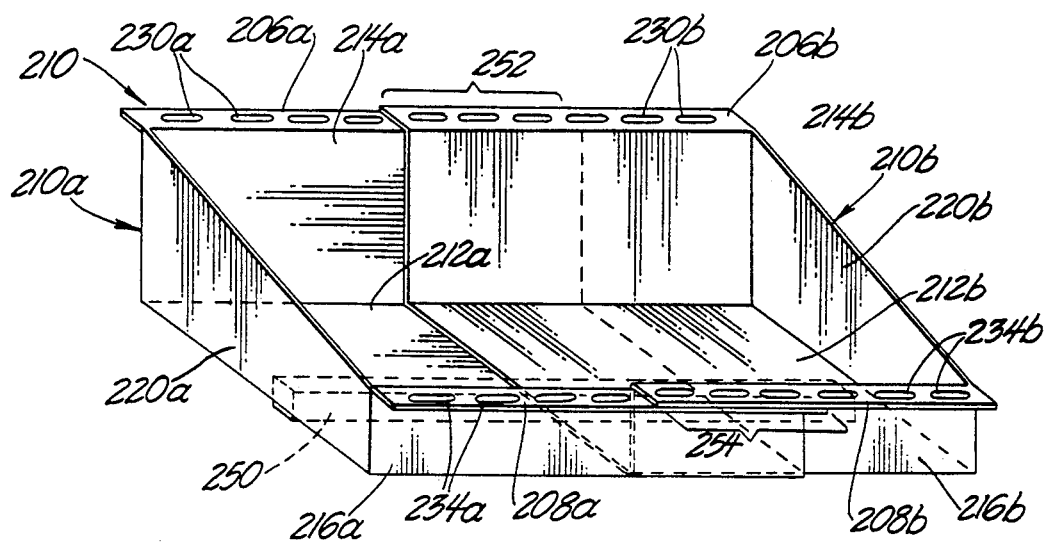
FIG. 3 is a perspective view of a third embodiment of the invention.

FIG. 1 shows tray assembly 10 comprised of a rectangular bottom panel 12 integral with rear wall 14 and front wall 16. Trapezoidal sides 18 and 20 are connected to panel 12, side 18 and side 20 to form an open tray accommodating box 22 or other similarly sized object. Box 22 is held in place by a strap 24, which can be made of elastic material, and conventional buckle 26 allows strap 24 to be shortened, whereby the strap can be tightened upon box 22. In the absence of box 22, buckle 26 will allow strap 24 to be stretched straight and tight between rear wall 14 and front wall 16, so that strap 24 can be conveniently and securely stored on tray assembly 10. At either end of strap 24 is a hook such as shown at 28 and illustrated in more detail in FIGS. 5 and 5A.

Rear wall 14 defines a row of first elongate holes 30 which are sized to snugly receive hooks 28 and also defines a row of second elongate holes 32 which can similarly receive the hooks. It is contemplated that hooks 28 will enter holes 32 from inside tray assembly 10 so that the end of strap 24 nearer to wall 14 will be along the inside surface of that wall when the strap engages box 22. This allows strap 24 to engage a box of lower height than would otherwise be possible. Front wall 16 also defines a row of elongate holes 34 for receiving hooks.

Within tray assembly 10 is bulkhead 40, which for clarity is shown both FIGS. 1 and 1A. Bulkhead 40 has a trapezoidal wall 46 to which are connected tabs 42 and 44, each tab having round holes 50. Bulkhead 40 extends from rear wall 14 along panel 12 to front wall 16 and can be slid toward or from side 18 so that boxes of differing lengths can be accommodated within the tray assembly. Holes 50 of bulkhead 40 register with a selected one of holes 36 in front wall 16 and a selected one of holes 38 in rear wall 14. A locking device such as adjustable ball lock pin 48 can be inserted through the registered holes to positionally fix bulkhead 40 within tray assembly 10. The adjustable ball lock pin shown at 48 is made by Carr Lane Manufacturing Company of St. Louis, Mo.

A second embodiment of the tray assembly is shown in FIG. 2 at 110, the tray assembly having a tray half 110a slidably receiving tray half 110b. Tray half 110a has a bottom panel 112a integrally connected to a rear wall 114a, a front wall 116a and a side 120a. Extending outward from the top of rear wall 114a is flange 106a defining a series of elongate holes 130a and extending outward from the top of front wall 116a is flange 108a defining a similar set of elongate holes 134a. Tray half 110b has a bottom panel 112b integrally connected to a rear wall 114b, a front wall 116b and a side 120b. Extending outward from the top of rear wall 114b is flange 106b defining a series of elongate holes 130b and extending outward from the top of front wall 116b is flange 108b defining a similar set of elongate holes 134b. Side 120a defines a row of round holes 136 and side 120b defines a set of round holes 138.

Within tray assembly 110 is a forwardly or rearwardly movable telescoping bulkhead 140, a cross section of which is shown in FIG. 2A. Bulkhead element 141a is slidably received in bulkhead element 141b, bulkhead element 141a having tab 144 and bulkhead element 141b having tab 142. The tabs each have holes 150 (FIG. 2A) which align respectively with a selected one of holes 136 in side 120a and selected one of holes 138 in side 120b. Tray assembly 110 will also have a strap, buckle and hooks like those shown in the FIG. 1 embodiment. Hook 28 (FIGS. 1, 5 and 5A) will closely fit through aligned holes 130a and 130b at zone 152 and within aligned holes 134a and 134b at zone 154. This feature and bulkhead 140 will inhibit relative tilting of tray half 110a and tray half 110b. The hooks additionally prevent relative sliding movement of the tray halves.

Figure 4:
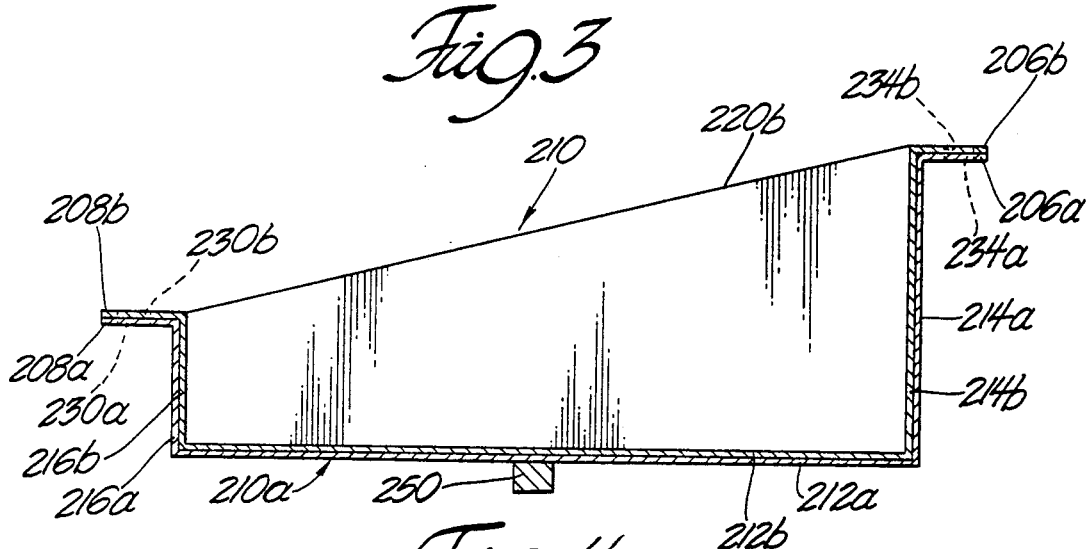
FIG. 4 is an end elevational view of the tray assembly shown in FIG. 3.

A third embodiment of the tray assembly is shown in FIGS. 3 and 4 at 210, the tray assembly having a tray half 210a slidably receiving tray half 210b. Tray half 210a has a bottom panel 212a integrally connected to a rear wall 214a, a front wall 216a and a side 220a. Extending outward from the top of rear wall 214a is flange 206a defining a series of elongate holes 230a and extending outward from the top of front wall 216a is flange 208a defining a similar set of elongate holes 234a. Tray half 210b has a bottom panel 212b integrally connected to a rear wall 214b, a front wall 216b and a side 220b. Extending outward from the top of rear wall 214b is flange 206b defining a series of elongate holes 230b and extending outward from the top of front wall 216b is flange 208b defining a similar set of elongate holes 234b. Fixed to the underside of bottom panel 212a is an elongate runner 250, the runner extending under but not fixed to panel 212b.

It is contemplated that hook 28 (FIGS. 1, 5, 5A and 6) will closely fit through aligned holes 230a and 230b at zone 252 and within aligned holes 234a and 234b at zone 254. This will prevent tray half 210a and tray half 210b from relative sliding and relative tilting movement. Runner 250 will further assist in preventing relative tilting movement between the tray halves. Strap 24 will connect the hooks and be adjustable by a buckle 26 in the same fashion as in the FIG. 1 embodiment, the hooks, strap and buckle being omitted in FIGS. 3 and 4 for convenience.

Figure 4A:
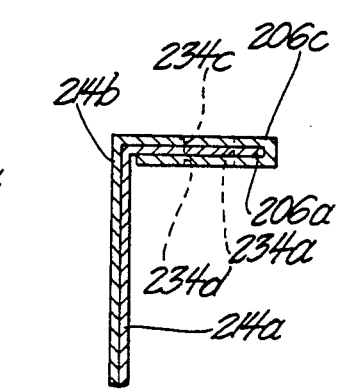
FIG. 4A shows a modification of the flanges of the third embodiment.

FIG. 4A shows a modification to flange 206b of FIG. 4, the modification being a wrap-around flange 206c which closely sandwiches the unmodified flange 206a therein, whereby relative tilting movement of tray halves 210a and 210b is prevented. Elongate holes 234c and 234d can be congruently aligned with elongate hole 234a. It will be understood that flange 208b can be modified in the same manner as flange 206b.

Figures 5, 5A:
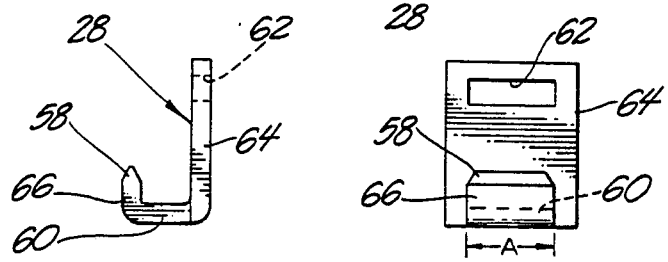
FIGS. 5 and 5A are elevational views of a hook that forms part of the invention in all embodiments thereof.
Figure 6:
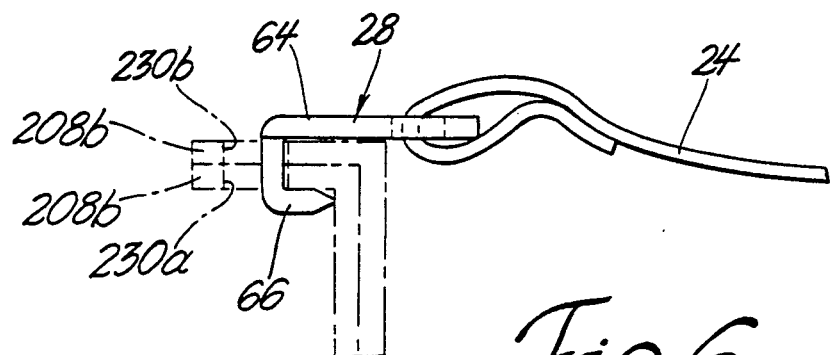
FIG. 6 shows a detail view of the hook connected to flanges of the tray assembly.

FIGS. 5 and 5A show that hook 28 includes a narrowed extension 60 whose width "A" and whose cross-sectional shape is chosen so that extension 60 snugly fits between the ends of elongate holes 30, 32, 34, 130a, 130b, 134a, 230a, 230b 234a, and 234b in the various embodiments. Hook 28 also has a tapered end 58 to ease entry of the hook into the various elongate holes. The hook will engage flanges as shown in FIG. 6, the distance between shank 64 and hook segment 66 preferably being equal to the combined thickness of two flanges, as shown in the figure with respect to flanges 208a and 208b. Hook 28 has an opening 62 to accommodate attachment of strap 24.

Figure 7:
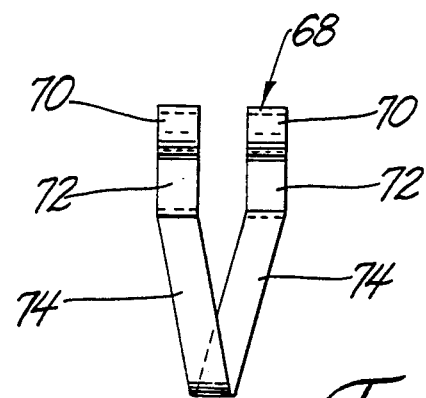
FIGS. 7 and 8 are front and side elevational views, respectively, of a spring clip that can optionally be used to fix the bulkhead relative to the tray assembly.
Figure 8:
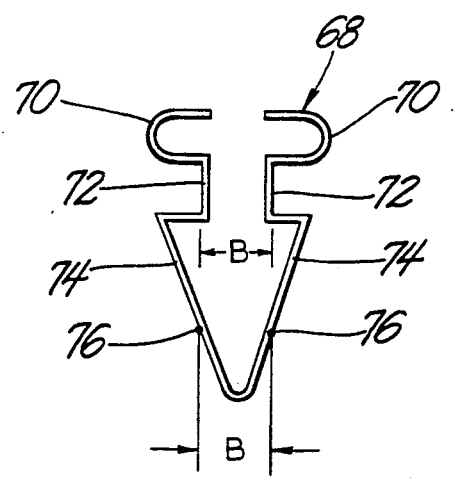

FIGS. 7 and 8 show an example of a spring clip 68 which can be used in place of ball lock pin 48. Clip 68 has a V-shaped portion of flexible metal having points 76 thereon. In the clip's free state, points 76 are apart from each other by a distance "B" equal to the diameter of holes 36 and 38 in the FIG. 1 embodiment of the tray assembly or equal to the diameter of holes 136 and 138 in the FIG. 2 embodiment. Adjacent V-shaped segment 74 are neck segments 72 whose outer surfaces are also a distance "B" from each other. Handles 70 are connected to neck segments 72. The clip is used by pushing it through a hole such as hole 36 and at the same time into hole 50 in the bulkhead 40. The edge of hole 36 and 50 will first bear against points 74 and then squeeze the clip as the clip is forced into the hole. When V-shaped portion is completely through the hole, then neck portions 72 will bear against the sides of the hole. Clip 68 is locked in place because handles 70 and V-shaped portions are wider than the diameter of the holes. To remove the clip, handles 70 are manually squeezed together until V-shaped portion 74 can be pulled back out of the holes.

We wish it to be understood that we do not desire to be limited to the exact details of construction shown and described herein since obvious modifications will occur to those skilled in the relevant arts without departing from the spirit and scope of the following claims.

We claim:

1. A tray assembly for storing boxes of ammunition or similar articles on a military vehicle, comprising:
    a first tray element;
    a second tray element closely and slidably received in the first tray assembly;
    a bottom panel for each tray element;
    rear walls connected to the bottom panels;
    front walls connected to the bottom panels;
    trapezoidal side panels connected along their edges to the bottom panels, the rear walls and the front walls;
    rear flanges along the upper edges of the rear walls;
    front flanges along the upper edges of the front walls;
    the rear flanges defining a row of first hook receipt holes;
    the front flanges defining a row of second hook receipt holes;
    the side panels defining rows of alignment holes;
    a strap connected between the front wall and the rear wall;
    hooks on the ends of the strap, one hook receivable in one of the first hook receipt holes, another hook received in one of the second hook receipt holes;
    buckle means on the strap for adjusting the length of the strap;
    a telescoping bulkhead connected between the side panels;
    tabs on the bulkhead, one tab faced against one side panel, another tab faced against another side panel;
    the tabs defining tab holes, the tab holes alignable with selected first and second alignment holes;
    releasable lock means extending through the tab holes and selected alignment holes for fixing the bulkhead in place within the tray assembly.

2. The tray assembly of claim 1 wherein the hook receipt holes are elongate holes whose longitudinal axis is parallel to the upper edges of the walls.

3. The tray assembly of claim 2 wherein:
    at least one of the receipt holes of the first tray element is in registry with one of the receipt holes of the second tray element;
    the hooks have a hook portion inserted through the hook receipt holes, the hook portion having a width dimension equal to the length dimension of the elongate holes, whereby the hooks prevent relative sliding movement of the tray elements and inhibit relative tilting movement of the tray elements.

4. The tray assembly of claim 3 wherein the hooks further include:
    a shank;
    a hook extension faced toward the shank;

the distance between the shank and the hook extension being equal to the combined thickness of one of the flanges resting atop another of the flanges.

5. The tray assembly of claim 4 wherein the releasable lock means is a clip comprised of:
- a V-shaped section including two spring arms diverging from a connection;
- neck segments attached to the arms, the distance between the neck segments being equal to a greatest dimension of one of the alignment holes;
- handles connected to the neck segments, the neck segment and handle on one arm being movable about the connection past the neck segment and the handle on another arm.

6. A tray assembly comprising:
- a first tray element having a first panel, a first tray wall connected to the first panel and a first opposing wall connected to the first panel and faced toward the first tray wall;
- a second tray element slidably received in the first tray element, the second tray element having a second panel, a second tray wall connected to the second panel, and a second opposing wall faced toward the second tray wall;
- a first side panel connected to the first panel, the first tray wall and the first opposing wall;
- a second side panel connected to the second panel the second tray wall and the second opposing wall;
- tray flanges along the tray walls, the tray flanges defining one set of receipt holes,
- elongate flanges along the opposing walls, the elongate flanges defining another set of receipt holes;
- a strap;
- means for engaging the receipt holes on either end of the strap, a first connector means engaging a receipt hole in the one set, a second connector means engaging a receipt hole in the other set;
- means for adjusting the length of the strap;
- a bulkhead between the side panels, the bulkhead being adjustable in length;
- means for connecting the bulkhead at a selected one of a plurality of positions between the side panels.

7. The tray assembly of claim 6, further comprising:
- tabs on the bulkhead adjacent the side panels; the tabs defining first alignment holes;
- the side panels defining arrays of second alignment holes;
- a clip passing through one of the first alignment holes and one of the second alignment holes.

8. The tray assembly of claim 7 wherein the clip has a V-shaped section including two spring arms diverging from a connection; neck segments attached to the arms, the distance between the neck segments being equal to a width dimension of one of the alignment holes; handles connected to the neck segments, the neck segment and handle on one arm being movable about the connection past the neck segment and handle on another arm.

* * * * *